United States Patent Office 2,917,500
Patented Dec. 15, 1959

2,917,500

OLEFIN POLYMERIZATION WITH MIXTURES OF ALUMINUM, PHOSPHORUS OR ANTIMONY HALIDE, AND A TITANIUM COMPOUND

Hugh J. Hagemeyer, Jr., and Marvin B. Edwards, Longview, Tex., assignors to Eastman Kodak Company, Rochester, N.Y., a corporation of New Jersey No Drawing. Application September 13, 1956
Serial No. 609,535

7 Claims. (Cl. 260—94.9)

This invention relates to the catalytic polymerization of normally gaseous α-monolefins to high molecular weight, highly crystalline solid polymers, and is particularly concerned with the polymerization of ethylene, propylene or mixtures thereof to form solid high density polymer.

For many years, the Friedel-Crafts type catalysts, such as aluminum chloride, were used to polymerize olefins to form low molecular weight liquid polymers. Finally, in 1939, Fawcett et al. disclosed in U.S. 2,153,553 that ethylene could be polymerized to a solid waxy polymer by the use of pressures in excess of 500 atmospheres and usually of the order of 1000–2000 atmospheres. The polyethylene thus formed has become a very valuable article of commerce and is characterized by its flexibility and film forming properties. Such high pressure polyethylene possesses a rather high degree of chain branching, however, and hence has a relatively low softening temperature, a low density and relatively low crystallinity.

Despite intensive research, the high pressure process was the only practical method of producing solid polyethylene for nearly twenty years.

At about the same time that Fawcett et al. discovered high pressure polymerization, Hall and Nash (J. Inst. Petroleum Tech., 23, 679–87 (1937)) used a mixture of aluminum chloride and aluminum as catalyst for ethylene polymerization but found that, as with aluminum chloride alone, only low molecular weight oils were formed. Thereafter, in 1943, Fischer found that where titanium tetrachloride was employed in conjunction with the aluminum chloride, either with or without a small amount of iron, zinc or aluminum, the product obtained was a mixture of a major proportion of low molecular weight oil such as is obtained by aluminum chloride alone or by aluminum chloride and aluminum in combination, together with a minor proportion of solid waxy polymer (German Patent 874,215). Even though the Fischer process could be carried out at pressures of the order of 50 atmospheres, it achieved no commercial importance as compared to the Fawcett et al. high pressure process because of the relatively low yield of solid polymer and the relatively low molecular weight of such polymer.

Nearly ten years later, Ziegler and Gellert (German Patent 878,560) found that low molecular weight ethylene polymers could be made using alkyl aluminum catalysts. Thereafter, Ziegler (Belgian Patent 533,362) found that the alkyl aluminums, such as aluminum triethyl, could be activated by use in combination with a transition metal compound, such as the titanium tetrachloride of Fischer, to give much improved yields of solid polymer which proved to be of high molecular weight, high density and high crystallinity. The lack of branched chaining gave a material having considerably greater rigidity than the usual high pressure polyethylene, and, in addition, the high density polymer could be formed at moderate pressures and exhibited an increased softening point temperature. Ziegler also found (Belgian Patents 534,792 and 534,882) that the alkyl aluminum halides, alkyl zinc halides, and alkyl magnesium halides with such activators also gave good yields of solid polyethylene. Thus, it appeared that it was necessary to employ either an aluminum alkyl or an alkyl aluminum halide in combination with the activator metal compound in order to achieve satisfactory conversion to high molecular weight solid polymer. The use of such catalyst combinations, however, gives rise to serious handling difficulties in commercial practice because they are extremely pyrophoric and must be kept under nitrogen. Furthermore, the aluminum alkyls and alkyl aluminum halides are relatively expensive materials.

It was indicated in Anderson et al. 2,721,189 that ethylene can be converted to solid polymers using a titanium compound having a valence state in excess of 2 with a particular type of reducing agent. Experience has shown, however, that there are many combinations of reducing agents and titanium compounds which will not polymerize ethylene to solid polymer, such as, for example, mixtures of aluminum and titanium tetraalkoxides as well as other specific combinations set out hereinafter. As has been indicated, the Fischer combination of aluminum, aluminum chloride and titanium tetrachloride under the conditions disclosed in German 874,215 gives only a small proportion of solid polymer whereas it is necessary for commercial operations that high yields of polymer be obtained, and that this polymer be formed without concomitant formation of undesirable liquid, greasy or waxy products. One method of obtaining solid polymer exclusively is with such three-component catalysts as disclosed in the copending application of Shearer et al. Serial No. 559,537, filed January 17, 1956, wherein unusually good results were obtained by using certain specific catalyst ratios in a modified Fischer process.

Attempts were made to increase the effectiveness of the Fischer process by replacing the aluminum chloride with other compounds which might serve to give an active catalyst mixture without the concomitant formation of low molecular weight liquid or semiliquid products. One such possibility appeared to be the use of stannic chloride in place of aluminum chloride. It was found, however, that although the stannic chloride resulted in solid polymer exclusively, the yield of polymer was extremely low and not suitable for commercial operations. Based on the Ziegler disclosures as well as the disclosures of Anderson, it would be assumed that various metal alkyls could be used in the combination in place of aluminum chloride to give improved results for Fischer. Accordingly, such compounds as triethylarsine and triethylphosphine with aluminum metal and titanium compounds were used in an attempt to form solid polymer, but such combinations were almost wholly ineffective for polymerizing α-olefins such as ethylene and propylene to solid polymer. It is thus apparent that the polymerization of olefins to solid polymers proceeds through some mechanism which is not readily understood or explained by the theories advanced thus far for polymerization. This is further illustrated by the fact that certain metal oxides and particularly certain metal oxides in combinations with activating materials also give high density polyethylene comparable to that obtained with certain reducing agents and certain titanium compounds, even though such catalyst systems do not include any titanium compound. Furthermore, it has been found that titanium alkoxides are quite effective in certain catalyst combinations but are wholly ineffective in other catalyst combinations. Thus, for example, mixtures of aluminum triethyl and titanium tetraalkoxides are wholly ineffective even for polymerizing ethylene which is the most readily polymerizable of the α-monoolefins whereas mixtures of aluminum triethyl and titanium tetrachloride give good yields of solid high density polyethylene. It is thus apparent that the catalytic mixtures which will satisfactorily polymerize α-olefins are largely unpredictable, and particularly it was not obvious how the Fischer type catalysts could be modified to give high yields of solid high density polymers.

It is therefore an object of this invention to provide a new and improved process for effecting conversion of normally gaseous α-monoolefins, such as ethylene or propylene, or mixtures thereof to high molecular weight, highly crystalline solid polymers in high yield without the concomitant formation of objectionable amounts of low molecular weight waxy or liquid products. Another object of the invention is to provide a new and improved process for catalytic polymerization of ethylene and similar α-monoolefins of 2–10 carbon atoms to high density solid polymers employing combinations of readily available, inexpensive catalytic components which are not pyrophoric in character and which do not suffer the disadvantages in handling characteristic of the pyrophoric catalysts heretofore employed. Another object of the invention is to facilitate the commercial manufacture of high density, highly crystalline polyolefins by providing an economical process which gives very high yields of solid polymer at low or intermediate pressures and at temperatures ranging from 50° to about 200° C. Other objects will be apparent from the description and claims which follow.

These and other objects are attained by means of this invention wherein it was found unexpectedly that the normally gaseous α-monoolefins containing 2–10 carbon atoms, either singly or in admixture, could be converted in high yield to high molecular weight, highly crystalline solid polymers without the concomitant formation of low molecular weight waxy or liquid polymers by effecting the polymerization in the presence of a catalytic mixture of aluminum metal and a titanium compound as disclosed by Fischer but replacing the aluminum chloride of Fischer with either phosphorus halide or antimony halide. In particular, the process embodying this invention comprises effecting the polymerization of α-monoolefins to solid polymer using a catalyst mixture of aluminum metal, a titanium compound which is soluble in hydrocarbon solvents and either phosphorus or antimony halide in a ratio of 0.1–3 moles of the phosphorus or antimony halide and 0.1–10 moles of the titanium compound per gram atom of aluminum metal. It has now been found that the catalyst combinations embodying this invention give very high yields of solid polymer without concomitant formation of liquid or semi-liquid products when using either phosphorus halide or antimony halide in a polyvalent state in combination with the aluminum metal and the titanium compound. This result was particularly surprising since aluminum metal and titanium compounds useful in this invention such as titanium tetraalkoxides do not produce solid polyolefins, and the closely related stannic chloride gives very low yields of solid polymer when used in place of the phosphorus or antimony halides. Furthermore, the closely related organometallic compounds such as triethyl arsine and triethyl phosphine are totally ineffective when used in place of the phosphorus or antimony halides. As can be seen, the polymerization of olefins by catalyst combinations appears to be quite unpredictable and not subject to the generalizations which have been offered to explain various specific combinations which have been found to polymerize olefins. One aspect of the invention which is of considerable importance in addition to the nature of the catalyst components employed is the ratio of the catalyst components in the mixture. The mole ratio of the various components can be varied throughout the range indicated hereinabove, but changes in the mole ratio within this range exert a profound influence in the course of the polymerization. When relatively large amounts of the aluminum and the phosphorus or antimony halide are employed so that they are in excess over the titanium compound, high molecular weight, low melt index polymers are obtained and the catalyst mixture is extremely active. If the amount of the titanium compound is increased, the catalyst mixture becomes somewhat less active, and the polymer formed is of lower molecular weight and higher melt index. This is a particular advantage, because the melt index and the average molecular weight of the polymer obtained can be controlled within rather narrow limits by regulation of the ratio of aluminum-phosphorus or antimony halide-titanium compound whereby simple and positive control over the nature of the product is readily achieved. Another significant advantage of the invention is the fact that the normally gaseous α-monoolefins are converted rapidly and in high yield to solid highly crystalline polymers under a variety of temperature and pressure conditions while avoiding the formation of by-products such as low molecular weight oils or greases. The catalyst mixtures embodying the invention are stable and require no special handling techniques. The components of the catalyst mixture are not pyrophoric and are not subject to rapid inactivation by air. This superior stability of the catalyst mixtures of this invention permits precise control of the catalyst concentration and also means that the catalyst is not subject to accidental inactivation. Another advantage of the invention is that the catalysts defined can be used at pressures as low as atmospheric pressure, although somewhat higher pressures are preferred because of the increase in polymerization rate thereby achieved. Thus it is desirable to operate the polymerization process within the pressure range of from about 200 to about 1000 p.s.i., although higher or lower pressures can be employed. These intermediate pressures are, of course, of real advantage over the conventional processes employing extremely high pressures of the order of 500 atmospheres or more. The catalysts embodying the invention are particularly active at temperatures below 200°, and temperatures of 40–160° C. are generally employed with the temperature range preferably used being 80–110° C. In using the catalyst mixtures embodying the invention, it is not necessary to first preactivate the catalyst by heating the components thereof at elevated temperatures in order to get high yields of polymer.

The empirical nature of the catalysis to solid polymer is evidenced by the fact that other phosphorus and antimony compounds than the halides have proven ineffective in the process embodying this invention. This despite the fact that under certain conditions, aluminum and titanium tetrachloride are active polymerization catalysts. Furthermore, the individual components of the catalyst mixture are ineffective as catalysts when used alone, and aluminum in combination with many of the titanium compounds such as the alkoxides ineffective as catalysts in the absence of the phosphorus or antimony compound regardless of the conditions or relative ratios of the components.

In practicing the invention, the aluminum which is employed can be used in any form, although it is preferably in flake or finely divided form for optimum activity, rapid polymerization and high yield of polymer. The finely divided aluminum such as aluminum powder which is commercially available is preferably employed since no cleaning of the surface is necessary as is sometimes the case with the granular aluminum of commerce which is desirably cleaned with an acid or acid mixture, such as a mixture of nitric and hydrofluoric acid, or with a base, or with a reducing agent, for optimum results. The phosphorus or antimony halide which is employed is desirably the pentahalide, although lower but polyvalent states can be used if desired. The pentachlorides exhibit optimum activity, although the pentabromides can be used with less efficacious results. Of the two, phosphorus pentachloride is preferably used to antimony pentachloride because of higher yields of polymer.

The titanium compound which is employed can be any of the well known titanium compounds which are soluble in a hydrocarbon solvent and includes the titanium halides and the titanium alkoxides, including the alkoxides wherein two or more of the valences of the titanium are satisfied with an alkoxide group containing 1–18 carbon atoms. The remainder of the valences can be satisfied with fatty acid radicals such as the stearate, laurate and similar fatty acid radicals if desired. Thus the titanium compounds include such materials as titanium tetrachloride or trichloride, titanium tetrabromide, tetra-2-ethylhexyl titanate, i.e. the ester of titanic acid which is in the nature of an alkoxide, the unmodified alkoxides such as titanium tetrabutoxide or similar alkoxides containing 1–18 carbon atoms or such partial alkoxides as diisopropoxy titanium distearate. The various compounds of this category such as the so-called titanates and the alkoxides and alkoxide titanium stearates and the like are all included within the term titanium alkoxides, and such compounds are well known in the art and need not be specifically set out. Any of such titanium compounds are suitable for use in practicing the invention which is in sharp contrast to many of the catalyst systems wherein only the titanium halides possess any activity. Other suitable titanium tetraalkoxides include titanium tetraethoxide, titanium tetramethoxide, titanium tetraisobutoxide, titanium tetraisopropoxide, tetrastearyl titanate, tetraoctyl titanate, and the like.

The inventive process is carried out in liquid phase in an inert organic liquid, and preferably an inert liquid hydrocarbon vehicle, and the removal of catalyst is facilitated by operating below the melting point of the polymer. The process proceeds with excellent results over a relatively wide temperature range with temperatures of 20–200° C. being preferably employed, and particularly good results being obtained in the range of 40–160° C. The preferred temperature range is 80–110° C. The pressure can be varied as desired, with pressures as low as atmospheric pressure being operable. Generally speaking, however, it is desirable to employ a pressure in the range of 0–1000 p.s.i.g. with pressures of from 200 to 1000 p.s.i.g. being preferred for optimum yields. In some cases, higher pressures such as are employed in the conventional high pressure processes can be used but are usually not necessary. Thus, pressures of as much as 20,000 p.s.i.g. or higher can be used in some instances. The liquid vehicle employed is desirably one which serves both as a liquid medium and as a solvent for the solid polymerization products at the temperature of polymerization. The great increase in polymerization rate with increasing pressures makes the use of pressures of 300–500 p.s.i. desirable.

The invention is applicable for polymerizing any of the well known α-monoolefinic hydrocarbons and preferably those containing from 2 to 10 carbon atoms. In most cases, the invention is particularly applicable for polymerizing ethylene, propylene or mixtures thereof, although any of the monoolefins can be used or any mixtures of monoolefins depending upon the type of product desired. When ethylene is employed as the monomer, the polyethylene obtained has a softening point or fusion point greater than 130° C. which means that products prepared therefrom can be readily employed in contact with boiling water without deformation or other deleterious results. The polymers embodying this invention have molecular weights greater than 1000 and usually greater than 10,000. The achievement of extremely high molecular weights does not present a problem employing the catalytic process herein described, and molecular weights even greater than 1,000,000 can be readily attained. The high molecular weight, high density polyethylenes of this invention are insoluble in solvents at ordinary temperatures but are partially soluble in such solvents as xylene, toluene or tetralin at temperatures of about 100° C. With the exception of the compounds of extremely high molecular weight, the polyethylene obtained according to this invention is soluble in tetralin at 145° C. These solubility characteristics make it possible to carry out the polymerization process under conditions wherein a polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosities as measured in tetralin at 145° C. may be varied from about 0.5 or lower to 5.0 or higher. Melt indices as measured by the standard ASTM method may be varied from about 0.01 to 100 or even higher.

Thus, polyethylene prepared by means of this invention and having a molecular weight in the range of 50,000 exhibits a density above 0.95, a softening temperature of at least 130° C., a tensile strength of 3000–5500 p.s.i. and a stiffness in flexure at 5% deflection (ASTM test D747–50) of at least 50,000 p.s.i.

The polyolefins prepared in accordance with the invention can be molded or extruded into flexible plates or films. The products can be extruded to the form of pipe or tubing of greater rigidity than the usual high pressure polyethylene or can be injection molded into a great variety of articles. The polymers can also be cold drawn into ribbons, bands, fibers or filaments of high elasticity and rigidity. Fibers of high strength can be spun from the molten polyethylene obtained according to this process. The polypropylene prepared in the same way also has a very high degree of crystallinity and a very high density, and the polymers of other α-olefins have similarly improved properties. The process of the invention can also be employed to effect the copolymerization of ethylene with other polymerizable α-monoolefins and particularly with propylene. Other monoolefins which are suitably employed either alone or in admixtures include such materials as n-butylene, isobutylene, 1-pentene, 1-decene, 3-methylheptene, and similar α-monoolefins. In some cases, it is desirable to prepare copolymers of the α-monoolefins in order to modify the properties for particular uses such as in molding or extrusion applications. Thus, copolymers of 5–95% ethylene with 95–5% propylene are desirably prepared in many cases.

The polymerization embodying the invention is conveniently carried out in a dilute slurry of the catalyst components in an inert solvent, i.e. a solvent which does not contain oxygen. Suitable solvents include the aliphatic hydrocarbons such as propane, pentane or heptane; the aromatic hydrocarbons such as benzene, toluene or xylene; and halogenated hydrocarbons such as trichloroethylene or chlorobenzene. Petroleum fractions of suitable boiling range such as Stoddard solvent, kerosene or gasoline are also suitable. Thus, any of the well known inert solvents can be used provided the solvent is free of water, alcohol, ether, or other compounds containing oxygen. The concentration of catalyst in the solvent can be varied from about 0.01% to about 10%, with the preferred range being 1–4%. The high yields of polymer which are obtained lead to product which contains a relatively low amount of catalyst. In most cases it is desirable to remove the catalyst from the polymer product, and this can be accomplished by washing with alcoholic acid or alcoholic base solutions if polymerization is conducted at temperatures below the melting point of the polymer and the crude polymer is a finely divided powder.

If, on the other hand, the polymer is formed at temperatures above the melting point and the crude polymer is obtained in the form of large hardened chunks, the polymer should be converted to the powdered form prior to the catalyst removal step. This size reduction can be conveniently acocmplished by dissolving the polymer in a hot mixture of an aromatic hydrocarbon and an alcohol, such as a mixture of xylene and 2-ethylhexanol, and then reprecipitating the polymer. Polyethylene which is treated in this way is converted to a very fine powder from which the catalyst is readily removed by washing with alcohol. Filtration of the hot polymer solution prior to cooling often aids in preparing colorless polymers.

The polymerization embodying the invention can be carried out batchwise or in a continuous flowing stream process. The pressure in the polymerization system is readily achieved by pressuring the reactor with the monomer to be polymerized and continuously adding monomer to the system in order to maintain the pressure throughout the course of the polymerization. When a continuous process is employed, a polymerization mixture of constant composition is continuously and progressively introduced into the polymerization zone, and the mixure resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared by batch processes. The ethylene or other $\alpha$-monoolefin can be charged to the polymerization mixture either as a pure material or in admixture with other polymerizable or nonpolymerizable materials such as other $\alpha$-monoolefins or such materials as hydrogen or saturated hydrocarbons such as methane, ethane or propane. Ordinarily, relatively pure monomers are employed unless copolymers are desired. When the charged mixture consists of two or more olefins, the product consists of a true copolymer of the monomers rather than a mixture of homopolymers.

Best results are achieved using temperatures of 40–160° C., and more desirably 80–110° C. with pressures of 200–1000 p.s.i. In continuous processes, the temperature is desirably maintained at a substantially constant value within the preferred range in order to achieve the highest degree of uniformity. The amount of vehicle employed can be varied over rather wide limits relative to the monomer. The concentration of the monomer in the vehicle will depend upon the reaction conditions and will usually range from about 2 to 50% by weight, or preferably from about 2 to about 10% by weight based on the weight of the vehicle. Concentrations of monomer in the vehicle of about 3–7% by weight are commonly employed, although higher concentrations ordinarily increase the rate of polymerization. Concentrations above 5–10% by weight are ordinarily less desirable because the polymer dissolved in the reaction medium results in a very viscous solution. The polymerization time can be varied as desired from a period of a few minutes or hours to several days. When a continuous process is employed, the contact time in the polymerization zone can also be regulated as desired, and in some cases it is not necessary to employ reaction times much beyond one-half to one hour since a cyclic system can be employed involving precipitation of the polymer and return of the vehicle and unused catalyst to the charging zone wherein the catalyst can be replenished and additional monomer introduced. The polymerization is desirably carried out under such conditions that the vehicle employed is maintained in liquid form during the polymerization. In addition to the types of insert vehicles set out hereinabove, such materials as ethyl benzene, isopropyl benzene, ethyl toluene, n-propyl benzene, diethyl benzenes, mono and dialkyl naphthalenes, n-octane, isooctane, methyl cyclohexane, tetralin, decalin and any of the other well known inert liquid hydrocarbons or other organic solvents containing no oxygen can be used.

The polymerization is ordinarily accomplished by merely admixing the components of the polymerization mixture, and by merely raising the temperature to 40° C. or higher. When operating at atmospheric pressure, the gaseous olefin can be merely bubbled through the catalyst slurry, although it is desirable to employ elevated pressures wherein the pressure above the polymerization mixture is the monomer being polymerized so that higher concentrations of monomer in the mixture are obtained and the course of the polymerization can be readily followed by the rate at which the monomer is used up which results in a decrease in the pressure. Temperature control of the polymerization process is relatively simple since the solvent vehicle forms a high percentage of the polymerization mixture and hence can be heated or cooled to maintain the temperature as desired.

The invention is illustrated by the following examples of certain preferred embodiments thereof. It will be understood, however, that the examples are merely illustrative and are not intended to limit the scope of the invention unless otherwise specifically indicated.

Example 1

A catalyst mixture prepared from 0.60 g. (0.222 atom) of aluminum powder, 4.56 g. (0.02 mole) of phosphorus pentachloride, and 3.8 g. of titanium tetrachloride in 500 ml. of heptane was charged to an 1800-ml. autoclave. The air in the autoclave was displaced with ethylene and the catalyst mixture was heated to 110° and agitated with ethylene at 900–500 p.s.i. for five hours. At four times during the polymerization, fresh ethylene was charged to the autoclave in order to restore the pressure to 900 p.s.i. The solid polyethylene produced was freed of heptane by drying in a vacuum oven to give 301 g. of product. The polymer was freed of catalyst by dissolving it in the minimum amount of 60:40 xylene-2-ethylhexanol, cooling to reprecipitate the polymer and washing the polymer with hot methanolic sodium hydroxide solution and methanol. The melt index of the purified polymer was 4.39. The solid polymer obtained was essentially free of low molecular weight liquid and waxy components. The polyethylene obtained was a highly crystalline, high density solid having less than 0.5 methyl groups per hundred carbon atoms and having a density in excess of 0.95. The polymer was an excellent molding material which was much stiffer than the normal high-pressure polyethylene and was suitable for use in applications where it came into contact with boiling water since the softening point of the polymer was above the boiling point of water and hence the polymer showed no deformation in boiling water.

The specific nature of the catalytic action was readily shown by repeating the polymerization using a catalyst mixture in the ratio of 0.22 atom of aluminum powder, 0.02 mole of stannic chloride and 0.02 mole of titanium tetrachloride in heptane. With a catalyst concentration twice that of the process embodying this invention and a polymerization period of 16 hours as contrasted to 5 hours in the process described above, only 16 g. of solid polymer was obtained as contrasted to 301 g. of polymer in the process embodying the invention. Thus it can be seen that the specific catalyst combination defined herein is necessary in order to achieve the process of commercial utility, and that a change in one of the components of the catalyst mixture has a profound effect on the course of the polymerization. The fact that the polymerization does not proceed through the usual mechanism attributed to many of the catalytic processes by formation of an organo derivative was shown by the fact that when the phosphorus pentachloride was replaced by triethyl phosphine, no solid polymer was obtained.

*Example 2*

As has been indicated, aluminum powder and either phosphorus halide or antimony halide are essential components in the catalyst mixture, but any of the titanium compounds soluble in the reaction vehicle can be used. Thus, a catalyst mixture was prepared from 4.3 g. (0.16 mole) of aluminum powder, 9.1 g. (0.04 mole) of phosphorus pentachloride and 3.7 g. (0.005 mole) of diisopropoxy titanium distearate in 500 ml. of heptane. This catalyst mixture was charged to the autoclave and the autoclave was pressured with ethylene at 800–600 p.s.i. for 10 hours at 90° C. After the polymer produced was washed free of catalyst with hot methanolic hydrochloric acid, hot methanolic sodium hydroxide and water, 97.4 g. of high density, highly crystalline polyethylene having a melt index of 1.55 was obtained. Similar results are achieved with the other titanium alkoxides although the titanium chlorides and particularly the titanium tetrachloride is preferred for optimum yields and maximum rate of polymerization.

*Example 3*

The phosphorus pentachloride in the catalyst mixture can be replaced with antimony pentachloride with almost equally good results. Thus the results achieved in Example 1 were substantially duplicated by contacting ethylene at 95° C. and 800 p.s.i. pressure for 20 hours with a catalyst mixture composed of 0.6 g. (0.222 atom) of aluminum powder, 0.02 mole of antimony pentachloride and 0.02 mole of titanium tetrachloride in 500 ml. of heptane. Excellent copolymers of ethylene and propylene are also produced with this catalyst mixture as well as with the catalyst mixtures as shown in the preceding examples and as defined hereinabove. Other α-monoolefins such as propylene, 3-methyl heptene, and the like are also polymerized by the catalyst mixtures embodying the invention.

Thus by means of this invention a unique and specific catalyst combination is provided whereby α-monolefins are readily polymerized in excellent yields to give polymers of high utility. The process embodying the invention thus affords a commercially feasible process particularly for the formation of high density, highly crystalline polyethylene which is applicable for uses wherein increased stiffness and melting point are desirable properties. The components of the catalyst mixture are readily available materials which require no special handling, and the catalyst is thus particularly adapted for commercial operations, especially since the catalyst mixture is not readily inactivated by contact with air. The particular advantage of the invention is the fact that a wide range of polymeric products can be prepared by adjusting the mole ratio of the components of the catalyst mixture within the ranges herein defined whereby products of any desired properties can be achieved.

The polymers thus obtained can be extruded, mechanically milled, cast or molded as desired. The polymers are sometimes particularly valuable as blending agents with the relatively more flexible high-pressure polyethylenes to give any desired combination of properties. The polymers can also be blended with antioxidants, stabilizers, plasticizers, fillers, pigments and the like or mixed with other polymeric materials, waxes and the like. In general, aside from the relatively higher values for properties such as softening point, density, stiffness and the like, the polymers embodying this invention can be treated in similar manner to those obtained by other processes.

Although the invention has been described in detail with reference to certain preferred embodiments thereof, variations and modifications can be effected within the spirit and scope of the invention as described hereinabove and as defined in the appended claims.

We claim:

1. In the polymerization of at least one normally gaseous α-monoolefin, the improvement in forming solid polymer which comprises effecting the polymerization in the presence of a catalytic mixture of aluminum, a halide from the group consisting of phosphorus and antimony pentachlorides and pentabromides, and a titanium compound which is soluble in a hydrocarbon solvent and which is selected from the group consisting of halides and alkoxides wherein each alkoxide group contains 1–18 carbon atoms, the components of said catalyst mixture being in the ratio of 0.1–3 moles of said halide and 0.1–10 moles of said titanium compound to each gram atom of aluminum, the titanium in said titanium compound having a valence in the range of 3–4 inclusive.

2. In the polymerization of at least one normally gaseous α-monoolefin, the improvement in forming solid polymer which comprises effecting said polymerization in a liquid vehicle at a temperature of 40–160° C. in the presence of a catalytic mixture of aluminum, phosphorus pentachloride and a titanium halide which is soluble in a hydrocarbon solvent, the components of said catalyst mixture being in the ratio of 0.1–3 moles of said phosphorus pentachloride and 0.1–10 moles of said titanium halide to each gram atom of aluminum the titanium in said titanium halide having a valence in the range of 3–4 inclusive.

3. In the polymerization of at least one normally gaseous α-monoolefin, the improvement in forming solid polymer which comprises effecting said polymerization in a liquid vehicle at a temperature of 40–160° C. in the presence of a catalytic mixture of aluminum, antimony pentachloride and a titanium halide which is soluble in a hydrocarbon solvent, the components of said catalyst mixture being in the ratio of 0.1–3 moles of said antimony pentachloride and 0.1–10 moles of said titanium halide to each gram atom of aluminum the titanium in said titanium halide having a valence in the range of 3–4 inclusive.

4. In the polymerization of at least one normally gaseous α-monoolefin, the improvement in forming solid polymer which comprises effecting said polymerization in a liquid vehicle at a temperature of 40–160° C. in the presence of a catalytic mixture of aluminum, phosphorus pentachloride and a titanium alkoxide which is soluble in a hydrocarbon solvent and which contains at least two alkoxy groups wherein each alkoxy group contains 1–18 carbon atoms, the ratio of the components of said catalyst mixture being in the range of 0.1–3 moles of said phosphorus pentachloride and 0.1–10 moles of said titanium alkoxide to each gram atom of aluminum, the titanium in said titanium alkoxide having a valence in the range of 3–4 inclusive.

5. In the polymerization of at least one normally gaseous α-monoolefin, the improvement in forming solid polymer which comprises effecting said polymerization in a liquid vehicle at a temperature of 40–160° C. in the presence of a catalytic mixture of aluminum, antimony pentachloride and a titanium alkoxide which is soluble in a hydrocarbon solvent and which contains at least two alkoxy groups wherein each alkoxy group contains 1–18 carbon atoms, the ratio of the components of said catalyst mixture being in the range of 0.1–3 moles of said antimony pentachloride and 0.1–10 moles of said titanium alkoxide to each gram atom of aluminum the titanium in said titanium alkoxide having a valence in the range of 3–4 inclusive.

6. The method of polymerizing ethylene to solid polymer which comprises polymerizing ethylene in an inert organic liquid vehicle at a temperature of 80–110° C. in the presence of a catalytic mixture of aluminum, phosphorus pentachloride and titanium tetrachloride wherein the phosphorus pentachloride amounts to 0.1–3 moles and the titanium tetrachloride amounts to 0.1–10 moles per gram atom of aluminum.

7. The method of polymerizing ethylene to solid polymer which comprises polymerizing ethylene in an inert organic liquid vehicle at a temperature of 80–110° C. in the presence of a catalytic mixture of aluminum, antimony pentachloride and titanium tetrachloride wherein the antimony pentachloride amounts to 0.1–3 moles and the titanium tetrachloride amounts to 0.1–10 moles per gram atom of aluminum.

References Cited in the file of this patent

UNITED STATES PATENTS 2,085,535  Langedijk et al. _____ June 29, 1937

FOREIGN PATENTS 875,215  Germany _____ Apr. 20, 1953

OTHER REFERENCES

Groggins: "Unit Processes in Organic Synthesis," fourth edition, page 846 (1952).